Figure 1:
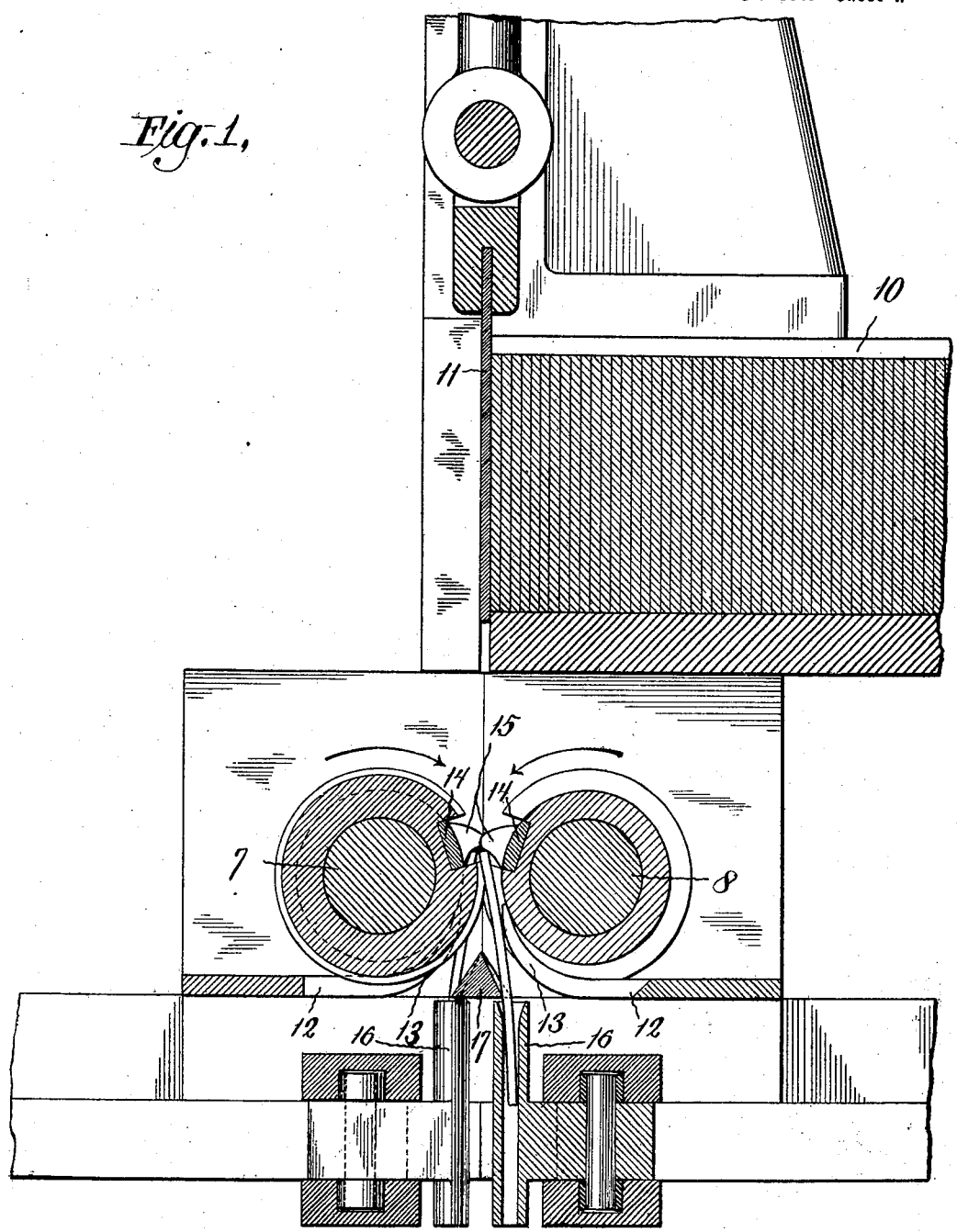

No. 682,787. Patented Sept. 17, 1901.
A. B. CALKINS.
ROTARY CUTTER MECHANISM.
(Application filed Dec. 8, 1900.)
(No Model.) 3 Sheets—Sheet 1.

WITNESSES: INVENTOR
Almon B. Calkins
BY
HIS ATTORNEY

No. 682,787. Patented Sept. 17, 1901.
A. B. CALKINS.
ROTARY CUTTER MECHANISM.
(Application filed Dec. 8, 1900.)
(No Model.) 3 Sheets—Sheet 2.
Fig. 2,
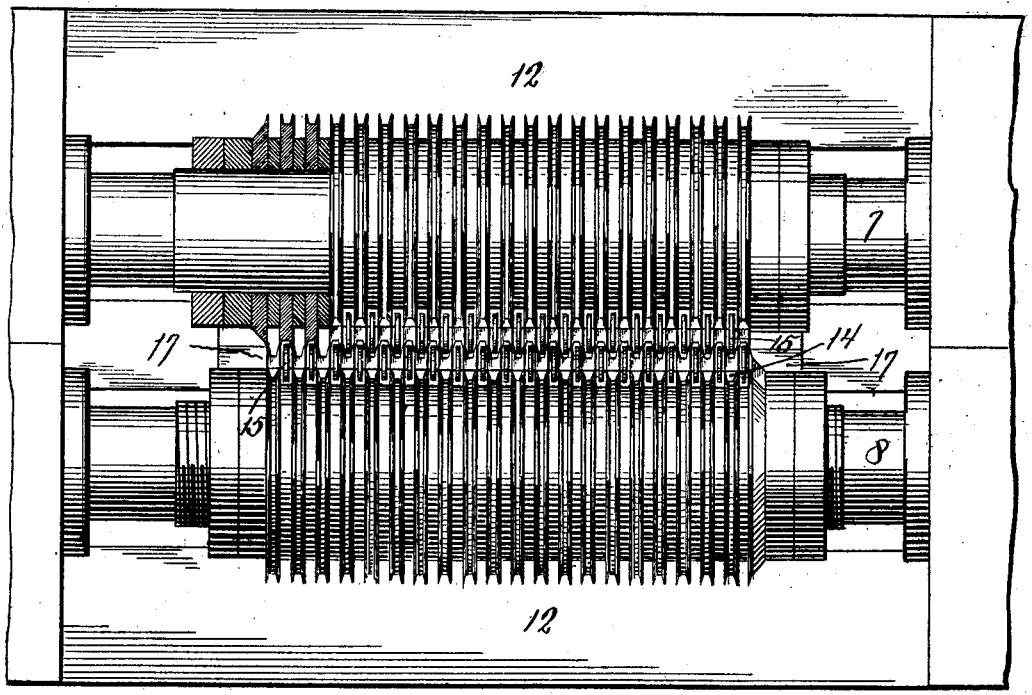
Fig. 6,
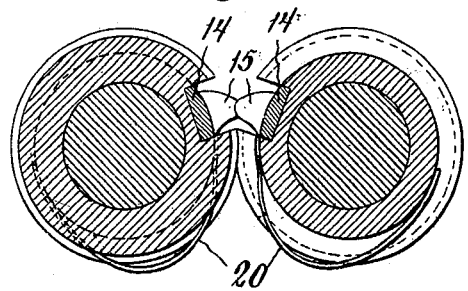
WITNESSES:
INVENTOR
Almon B. Calkins
BY
D. Howard Raymond
HIS ATTORNEY
THE NORRIS PETERS CO., PHOTO-LITHO., WASHINGTON, D. C.

No. 682,787. Patented Sept. 17, 1901.
A. B. CALKINS.
ROTARY CUTTER MECHANISM.
(Application filed Dec. 8, 1900.)
(No Model.) 3 Sheets—Sheet 3.
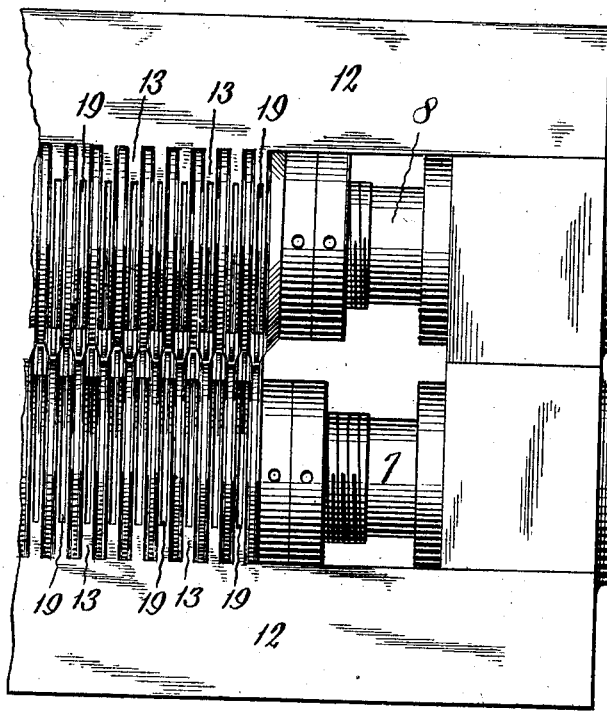
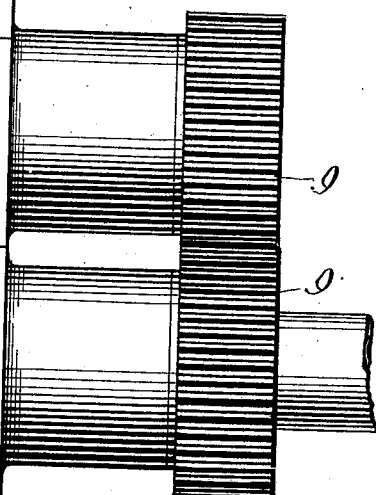
Fig. 3.
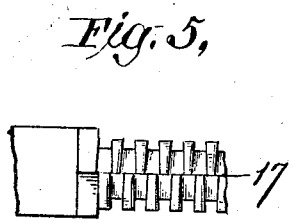
Fig. 5,
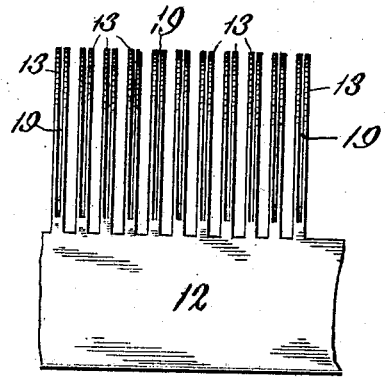
Fig. 4,
WITNESSES:
Harry Goss.
Harry S. Marsh.
INVENTOR
Almon B. Calkins
BY
D. Howard Haywood
HIS ATTORNEY
THE NORRIS PETERS CO., PHOTO-LITHO., WASHINGTON, D. C.

UNITED STATES PATENT OFFICE.

ALMON B. CALKINS, OF FRANKLIN, NEW JERSEY, ASSIGNOR TO AMERICAN MATCH MACHINE COMPANY, OF NEW YORK, N. Y.

ROTARY CUTTER MECHANISM.

SPECIFICATION forming part of Letters Patent No. 682,787, dated September 17, 1901.

Application filed December 8, 1900. Serial No. 39,200. (No model.)

*To all whom it may concern:*

Be it known that I, ALMON B. CALKINS, a citizen of the United States of America, and a resident of Franklin, county of Essex, State of New Jersey, have invented certain new and useful Improvements in Rotary Cutter Mechanism, of which the following is a specification, reference being had to the accompanying drawings, forming a part thereof.

My invention relates to rotary cutter mechanism, and particularly to means for expelling or discharging therefrom the material operated upon by the cutters.

The particular use to which I have hitherto applied my invention has been the converting of strips of veneer into match-splints, and for purposes of this specification I will describe my invention as operating in such connection. In operating upon the veneer I employ a plurality of rotary cutters oppositely arranged and having overlapping circumferential cutting edges and a suitable means for feeding the veneer to the said cutters. The cutters separate the veneer into a plurality of splints, and the arrangement and construction of the cutters are such that the alternate splints have a tendency to follow the direction of movement of the opposite cutters. In order to overcome this, I employ a means for applying pressure transversely of the splint when cut to force same radially away from the cutter, and I further provide means for expelling the splint from the cutter by pressure applied against the end thereof. This latter means preferably comprises lugs or projections which are carried by the cutters and secured to rotate therewith, the position of the lugs on the cutters being so arranged relatively to the feed of the veneer to the cutters that the said lugs engage with the rear ends of the match-splints into which the veneer has been separated upon rotation of the cutters, and the said match-splints are hence positively expelled.

The objects of my invention are to insure the positive delivery of the match-splints or other material passed through the cutters to suitable receivers, and generally to improve rotary cutters and their correlated mechanism.

My invention further consists in certain novel details of construction and combination of parts, as shall hereinafter be more fully set forth.

I will now proceed to describe a rotary cutting mechanism embodying my invention and will then point out the novel features in claims.

In the drawings, Figure 1 is a central transverse section of a rotary cutting mechanism embodying my invention. Fig. 2 is a top view of the same with the feed removed, certain portions being shown in section in order to better illustrate this construction. Fig. 3 is a bottom view of certain parts. Fig. 4 is a detail view of a stripping-comb employed. Fig. 5 is a detail view of a separator employed. Fig. 6 is a transverse sectional view of the cutter and certain means carried thereby in substitution of the stripping-combs employed in the preferred form of my invention.

In carrying out my invention I employ two parallel shafts 7 and 8, mounted in suitable fixed bearings and geared to rotate together, as by the gears 9. (See more particularly Fig. 3.) The shafts 7 and 8 carry each a plurality of cylindrical knives or cutters having circumferential cutting edges. The cutting edges of the knives or cutters upon one of the shafts 7 and 8 preferably overlap those upon the other of the said shafts. The cutters herein shown are especially adapted for operating upon sections of veneer for the purpose of separating same into match-splints. At 10 I have shown a feed-trough containing a number of veneers, (illustrated in Fig. 1 in cross-section,) and a reciprocating feed-plunger 11 is provided, which upon reciprocation is adapted to feed successive sections of veneer from the feed-trough to the cutters. The cutters are arranged to revolve in the direction of the arrows, as shown in Fig. 1, and alternate splints into which the veneer will be separated upon the rotation thereof will by reason of the shape and form of the cutters tend to follow the circumferential edges of the cutters. In order to discharge the splints from the cutters, I have provided means for applying pressure transversely of the longitudinal axes of the splints and means for expelling the splints by pressure applied against the end thereof.

In Figs. 1 and 3 the means for applying pressure transversely of the longitudinal axes of the match-splints is a comb 12, one of which is provided for each set of cutters. The combs have teeth 13, which are arranged between each pair of cutting edges of the cutters on each of the shafts. The ends of the teeth 13 of the combs 12 operate not only as strippers for applying pressure to the match-splints transversely of their longitudinal axes to force same away from the cutters, but, fitting, as they do, closely into the grooves between the cutters, tend to keep the grooves clear of slivers and dirt which might otherwise lodge or accumulate.

The cutters carried by each of the shafts 7 and 8 have a longitudinal groove therein extending from their edges inwardly and parallel of their axes of rotation. In the groove in the cutters carried by each shaft is fitted a bar 14, which is secured therein and which has a plurality of projections 15 extending outwardly and between each pair of cutting edges of the cutters. These projections are adapted to act as an expelling means for the match-splints by applying pressure against the ends thereof. This operation is clearly shown in Fig. 1 of the drawings, in which the lugs or projections 15 will be seen as in engagement with the ends of the splints into which the veneer has been separated. The splints are by this means positively forced into receivers 16, which are waiting to receive them. These receivers are not described in detail herein, as they form no part of this invention, but form the subject-matter of a copending application filed simultaneously herewith and having Serial No. 39,199. To obviate a possible tendency in the match-splints to pass down between the receivers, I have provided a suitable guide or separating bar 17. This bar is arranged midway between the cutters and will assist in guiding the match-splints toward the receivers. When the end of the match-splint has entered the receiver, the expelling device will force the same clear of the cutters. A stationary plate 18 is arranged below the receivers to prevent the splints from falling clear through. The projecting lugs 15 are made very thin and narrow, and the teeth 13 of the combs 12 are split or slotted, as at 19. (See more particularly Fig. 4.) The slots 19 are of such size as to permit the lugs 15 to enter therein, and the lugs 15 will hence pass the teeth 13 of the combs 12 without interference.

In Fig. 6 of the drawings I have shown a device carried by the cutters themselves for applying pressure to the match-splints transversely of their longitudinal axes and which in this form of my invention takes the place of the stripping-combs. This means consists of a number of spring-tongues 20, which are secured between the cutting edges of the rotary cutters at one of their ends and which have their other ends free. The resilience of these spring-tongues will apply the required transverse pressure to the match-splints when the splints tend to follow the path of movement of the cutting edges of the cutters. I have found that these spring-tongues are more or less efficacious in forcing the splint away from the cutting edges of the cutter; but they do not operate as efficaciously as the stationary stripping-combs heretofore described in keeping the grooves between the cutting edges free from slivers and preventing the accumulation of dirt, &c., therein. I do not desire, however, to be limited to the precise form and construction of my invention as herein shown and described, as the same may be obviously varied within wide limits without departing from the spirit and scope of my invention, and the spring-tongues are shown as one possible modification.

In referring to the cutters herein as having circumferential cutting edges I intend to define a cutter whose cutting edges make a cut or cuts longitudinally of the feed of the object being cut or in a direction transverse of the axis of rotation of the said cutter.

What I claim is—

1. The combination of two oppositely-arranged rotary cutters, each having a plurality of circumferential cutting edges, and each having a plurality of lugs or projections, adapted to act as expelling devices, one each of which is arranged between alternate pairs of cutting edges, the lugs or projections upon the opposite cutters arranged alternately of each other.

2. The combination of two oppositely-arranged rotary cutters, each having a plurality of circumferential cutting edges, and each having a plurality of lugs or projections extending beyond the cutting edges, said lugs or projections arranged one each between alternate pairs of cutting edges and adapted to act as expelling devices, the lugs or projections upon the opposite cutters arranged alternately of each other and overlapping and passing between each other in their path of movement.

3. The combination with two oppositely-arranged rotary cutters, each having a plurality of circumferential cutting edges, of two bars carried one each by each of the said cutters and secured to rotate therewith, each bar having a plurality of lugs or projections, adapted to act as expelling devices, one each of said lugs or projections arranged between alternate pairs of cutting edges, and the lugs or projections of the bars upon opposite cutters arranged alternately of each other.

4. The combination of a rotary cutter having circumferential cutting edges, a stripper, and an expelling device carried by the cutter and secured to rotate therewith.

5. The combination with a rotary cutter having circumferential cutting edges, of a stationary stripper, and an expelling device carried by the cutter and secured to rotate therewith.

6. The combination with a plurality of rotary cutters having circumferential cutting edges, of a stationary stripping-comb having teeth projecting between the cutters, and an expelling-comb carried by the cutters and secured to rotate therewith.

7. The combination with a rotary cutter having circumferential cutting edges, of a stationary stripper, and an expelling device carried by the cutter and secured to rotate therewith, said expelling device adapted to pass through the stationary stripper.

8. The combination with a plurality of rotary cutters having circumferential cutting edges, of a stationary stripping-comb, having split teeth projecting between the cutters, and an expelling-comb carried by the cutters and secured to rotate therewith, the teeth of the expelling-comb being arranged to pass between the split portions of the stripping-comb teeth.

9. The combination with rotary cutters having oppositely-arranged and overlapping circumferental cutting edges, of stationary stripping-combs for the cutters, and expelling-combs carried by the cutters and secured to rotate therewith.

10. The combination with rotary cutters having oppositely-arranged and overlapping circumferential cutting edges, of stationary stripping-combs having split teeth arranged between alternate pairs of cutting edges, and expelling-combs carried by the cutters, and secured to rotate therewith, the teeth of the said expelling-combs arranged to pass between the split portions of the stripping-comb teeth.

11. The combination with a rotary cutter having circumferential cutting edges for cutting match-splints, of means operating between the said cutting edges, for applying pressure transversely of the splint, after it has been cut, to force same away from the cutter, and means for expelling the said splint by pressure applied against the end thereof.

12. The combination with a rotary cutter having circumferential cutting edges for cutting match-splints, of means operating between the said cutting edges, for applying pressure transversely of the splint, after it has been cut, to force same away from the cutter, and means carried by the cutter, for expelling the said splint by pressure applied against the end thereof.

ALMON B. CALKINS.

Witnesses:
WILLIAM R. SWETT,
J. ARTHUR HOOKEY.